(12) United States Patent
Puddephat et al.

(10) Patent No.: US 11,547,061 B2
(45) Date of Patent: Jan. 10, 2023

(54) LIGHT SPECTRUM-MODIFYING NETTING FOR USE IN CITRUS FRUIT PRODUCTION

(71) Applicant: PepsiCo, Inc., Purchase, NY (US)

(72) Inventors: Ian James Puddephat, Leicester (GB); Simon Charles McWilliam, Leicester (GB); Yosepha Shahak, Visalia, CA (US); Avi Sadka, Rishon LeZion (IL); Elazar Zari Gal, Kibbutz Ginegar (IL)

(73) Assignee: Tropicana Products, Inc., Bradenton, FL (US)

( * ) Notice: Subject to any disclaimer, the term of this patent is extended or adjusted under 35 U.S.C. 154(b) by 383 days.

(21) Appl. No.: 16/604,657

(22) PCT Filed: Aug. 30, 2018

(86) PCT No.: PCT/EP2018/073397
§ 371 (c)(1),
(2) Date: Oct. 11, 2019

(87) PCT Pub. No.: WO2019/043121
PCT Pub. Date: Mar. 7, 2019

(65) Prior Publication Data
US 2021/0127592 A1  May 6, 2021

(30) Foreign Application Priority Data
Aug. 31, 2017 (GB) .................... 1713976

(51) Int. Cl.
*A01G 9/14* (2006.01)
*A01G 7/04* (2006.01)
(Continued)

(52) U.S. Cl.
CPC ........... *A01G 7/045* (2013.01); *A01G 9/1438* (2013.01); *A01G 13/0206* (2013.01);
(Continued)

(58) Field of Classification Search
CPC ...... A01G 13/00; A01G 13/02; A01G 13/026; A01G 13/0212; A01G 13/0256; A01G 13/0262; A01G 13/0268
See application file for complete search history.

(56) References Cited

U.S. PATENT DOCUMENTS

| 2015/0208590 | A1 | 7/2015 | Wu | |
| 2016/0353677 | A1* | 12/2016 | Toye | A01G 13/0206 |
| 2019/0387692 | A1* | 12/2019 | Fitzsimons | A01G 17/06 |

FOREIGN PATENT DOCUMENTS

| CL | 2016001634 | 2/2016 |
| CN | 104115711 | 10/2014 |

(Continued)

OTHER PUBLICATIONS

Examination Report issued in EP 18773092.4 dated Jun. 20, 2022.
Office Action dated Jun. 14, 2022 in Brazilian Appl. No. BR112019012113-7.

*Primary Examiner* — Kristen C Hayes
(74) *Attorney, Agent, or Firm* — Barnes & Thornburg LLP; G. Peter Nichols

(57) ABSTRACT

A photo-selective light spectrum-modifying net for use in citrus fruit production, the net comprising a woven array of parallel and mutually spaced first threads and an array of parallel and mutually spaced second threads, the second threads being inclined to the first threads to define an array of openings between the first and second threads, wherein the first threads are uncolored and composed of a first polymer which is selected from a polymer incorporating a white pigment or dye, a transparent polymer or a translucent polymer, and the second threads are colored red and composed of a second polymer which incorporates a red pigment or dye, the second threads being adapted to transmit, scatter and reflect electromagnetic radiation in the wavelength (Continued)

range of from 640 to 680 nm. Also disclosed is a method of producing citrus fruit using the net.

61 Claims, 10 Drawing Sheets

(51) Int. Cl.
  *D03D 15/54* (2021.01)
  *A01G 13/02* (2006.01)
  *A01G 13/10* (2006.01)
  *A01G 17/00* (2006.01)
  *D03D 1/00* (2006.01)
  *D03D 9/00* (2006.01)

(52) U.S. Cl.
  CPC ........... *A01G 13/10* (2013.01); *A01G 17/005* (2013.01); *D03D 1/0058* (2013.01); *D03D 9/00* (2013.01); *D03D 15/54* (2021.01); *A01G 2009/1446* (2013.01); *A01G 2009/1453* (2013.01); *A01G 2009/1461* (2013.01); *D10B 2401/22* (2013.01); *D10B 2505/18* (2013.01)

(56) References Cited

FOREIGN PATENT DOCUMENTS

| | | | |
|---|---|---|---|
| CN | 203872692 | 10/2014 | |
| CN | 104366633 | 11/2015 | |
| WO | 2010026227 | 3/2010 | |
| WO | 2010120201 | 10/2010 | |
| WO | WO-2012125049 A2 * | 9/2012 | ......... A01G 13/0256 |
| WO | 2014041499 | 3/2014 | |
| WO | 2014085626 | 6/2014 | |
| WO | 2014178733 | 11/2014 | |
| WO | 2015122783 | 8/2015 | |
| WO | 2017068563 | 4/2017 | |
| WO | WO-2017068563 A1 * | 4/2017 | ......... A01G 13/0206 |

* cited by examiner

Cultivar Valencia

Cultivar Hamlin

__LIGHT SPECTRUM-MODIFYING NETTING FOR USE IN CITRUS FRUIT PRODUCTION__

CROSS-REFERENCE TO RELATED APPLICATIONS

This application is a US 371 Application from PCT/EP2018/073397 filed Aug. 30, 2018, which claims priority to GB Application No. 1713976.7 filed Aug. 31, 2017, the technical disclosures of which are hereby incorporated herein by reference.

BACKGROUND OF THE INVENTION

Field of the Invention

The present invention relates to a photo-selective light spectrum-modifying net and to a method of producing citrus fruit using the net.

Description of the Prior Art

Citrus plants, such as orange, lemon and lime, are widely grown in citrus groves and there is an ever increasing need to increase crop yield, for example expressed as weight of citrus fruit per acre of citrus grove under cultivation in an environmentally sustainable manner. In particular, there is a desire to minimise water irrigation of the citrus grove, particularly in geographical regions which may have scare water resources. There is also a desire to minimise fertilizer application, which may be applied with water in a given proportion.

Referring to FIG. 10, this is a graph showing the relationship between radiation wavelength and light absorption for a citrus tree in incident sunlight and associated photosynthetic rate. It may be seen that in the wavelength range of blue light, from about 410-470 nm, there is increased absorption by both chlorophyll a and chlorophyll b. It may also be seen that in the wavelength range of red light, from about 640-680 nm, there is also increased absorption by both chlorophyll a and chlorophyll b. The increased absorption by both chlorophyll a and chlorophyll b corresponds to increased photosynthesis rate which can be drive increased fruit yield, and increased fruit quality. In contrast, in the wavelength range of green light, from about 480-640 nm, there is lower absorption leading to decreased photosynthetic rate but this contributes to the overall heat load on the plant. Increased heat load tends to increase the demand for water and irrigation of the plant, reduces photosynthetic output compromising fruit yield.

It is known that netting can permit light scattering, which permits light penetration through the tree canopy, leading to increased photosynthesis, and increased fruit yield. The netting can be photo-protective, and eliminate "non-productive" light. This can reduce the heat load, and thereby lower water use, and can increase photosynthesis, and increase fruit yield. The netting can be photo-selective, and enhance vegetative or reproductive signals, to trigger leaf growth or fruit growth. The netting can provide physical and thermal modulation, to resist temperature extreme and high wind speeds, which can increase photosynthesis, and increase fruit yield, and reduce crop failure, for example by damage by hail.

It is known to use nets to provide weather protection of plants and crops. For example, Ginegar Plastic Products, Inc. of Israel manufactures and sells netting under the trade name Polysack as a range of nets that protects plants and crops against damage caused by excessive radiation, wind, hail, birds and insects. Some of these nets also provide light spectrum management of the plants, for example, nets sold under the product names Pearl Leno, Crystal Leno, Red Leno and ChromatiNet Red Hail. For the red nets, it is disclosed that the net combines hail-protection together with light-spectrum management in greenhouses and shade houses, which protects against damage from hail, sunstroke and wind in orchards and vineyards; the net absorbs the UV, blue, green and yellow spectral regions of sunlight and thus increases the relative content of red and far red in the light that passes through it and creates a unique light composition to improve yields, accelerate growth, increase fruit size and bring forward fruit ripening. Light managements nets are also disclosed in U.S. Pat. No. 5,458,957 (Fryszer et al.), US Patent Application Publication No. 2002/0028620 (Guberman et al.) and US Patent Application Publication No. 2002/0056225 (Shahak et al.).

In spite of these prior disclosures, there is a need in the citrus-growing art to provide enhanced yield of citrus fruit per acre of citrus grove. There is also a need in the citrus-growing art to produce citrus fruit from a citrus grove with reduced demand or use of water for irrigation. There is also a need in the citrus-growing art to produce citrus fruit from a citrus grove with reduced energy input. There is also a need in the citrus-growing art to produce citrus fruit from a citrus grove with reduced fertilizer input.

The present invention aims at least partially to meet those needs. The present invention aims to provide a photo-selective light spectrum-modifying net which can increase citrus yield from a citrus grove, particularly from a grove of young or mature citrus trees already in commercial production. The enhanced yield can be achieved by providing the net above the citrus trees, and therefore the yield can be increased or maintained with reduced irrigation, and reduced energy and fertilizer input.

SUMMARY OF THE INVENTION

The present invention accordingly provides a photo-selective light spectrum-modifying net for use in citrus fruit production, the net comprising a woven array of parallel and mutually spaced first threads and an array of parallel and mutually spaced second threads, the second threads being inclined to the first threads to define an array of openings between the first and second threads, wherein the first threads are uncolored and composed of a first polymer which is selected from a polymer incorporating a white pigment or dye, a transparent polymer or a translucent polymer, and the second threads are colored red and composed of a second polymer which incorporates a red pigment or dye, the second threads being adapted to transmit, scatter and reflect electromagnetic radiation in the wavelength range of from 640 to 680 nm.

The present invention further provides a method of producing citrus fruit, the method comprising the steps of:
  i. providing a photo-selective light spectrum-modifying net comprising a woven array of parallel and mutually spaced first threads and an array of parallel and mutually spaced second threads, the second threads being inclined to the first threads to define an array of openings between the first and second threads, wherein the first threads are uncolored and are composed of a first polymer which is selected from a polymer incorporating a white pigment or dye, a transparent polymer or a translucent polymer, and the second threads are colored red and are composed of a second polymer which incorporates a red pigment or dye, the second threads being adapted to transmit, scatter and reflect electromagnetic radiation in the wavelength range of from 640 to 680 nm; and ii. supporting the net above at least one citrus tree.

The preferred embodiments of the present invention can provide a photo-selective light spectrum-modifying net for use in citrus fruit production, and an associated method of producing citrus fruit, which can remarkably increase citrus yield, particularly from a mature citrus grove when the net is supported above the citrus tree(s).

The present invention has particular application in the production of oranges.

BRIEF DESCRIPTION OF THE DRAWINGS

Embodiments of the present invention will now be described by way of example only with reference to the accompanying drawings, in which.

DETAILED DESCRIPTION OF THE EMBODIMENTS OF THE INVENTION

Figure 1:
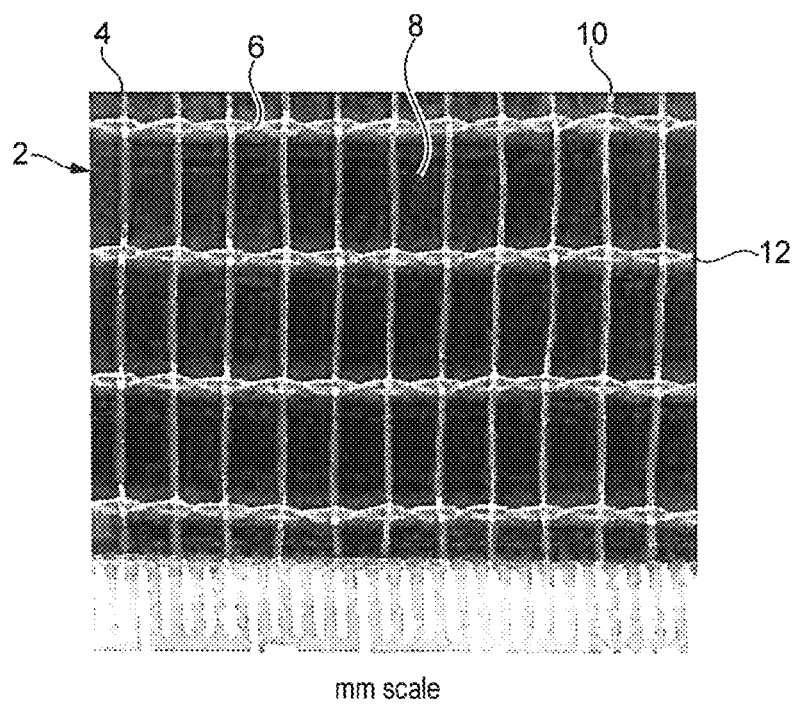
FIG. 1 schematically illustrates a plan view of a photo-selective light spectrum-modifying net in accordance with an embodiment of the present invention.

Referring to FIG. 1, there is shown a photo-selective light spectrum-modifying net 2 according to an embodiment of the present invention for use in citrus fruit production, in particular for production of citrus fruit from orange, lemon, lime, grapefruit or pomelo trees. The present has particular application for use in the production of oranges. The net 2 comprises a woven array of parallel and mutually spaced first threads 4 and an array of parallel and mutually spaced second threads 6. The second threads 6 are inclined to the first threads 4 to define an array of openings 8 between the first and second threads 4,6. In the illustrated embodiment, the first and second threads 4,6 are mutually orthogonal and the openings 8 are rectangular. However, in other embodiments, the first and second threads 4,6 may be inclined at an acute angle to provide non-rectangular openings 8.

Typically, the openings 8, which may be rectangular openings or in other embodiments may have any other two-dimensional shape, have an area of from 8 to 15 mm$^2$, more typically, from 10 to 12 mm$^2$. Typically, the first threads 4 have a spacing between adjacent first threads 4 of from 1.2 to 3 mm, more typically, from 1.8 to 2.5 mm, and/or the second threads 6 have a spacing between adjacent second threads 6 of from 4 to 6 mm, more typically from 4.5 to 5.5 mm.

In the illustrated embodiment, each first thread 4 comprises a single filament 10. The filament 10 in the first thread 4 has a typical width of from 0.26 to 0.3 mm. In addition, each second thread 6 comprises a plurality of filaments 12 which are helically wound together to form a multi-filament thread 6. Typically, each second thread 6 comprises two filaments 12 which are helically wound together to form a multi-filament thread 6. Each filament 12 in the second thread 6 has a width of from 0.26 to 0.3 mm.

Each of the first and second threads 4, 6 comprises a polymer, for example high density polyethylene (HDPE).

The first threads 4 are uncolored and composed of a first polymer which is selected from a polymer incorporating a white pigment or dye, a transparent polymer or a translucent polymer. In the illustrated embodiment, the first threads 4 are transparent and consist of a transparent polymer, in particular transparent high density polyethylene (HDPE).

In contrast, the second threads 6 are colored red and composed of a second polymer which incorporates a red pigment or dye. The second threads 6 are adapted, as a result of the red coloration and incorporation of red pigment or dye, to transmit, scatter and reflect electromagnetic radiation in the wavelength range of from 640 to 680 nm, and optionally electromagnetic radiation as low as 600 nm and higher than 680 nm and to absorb electromagnetic radiation in the wavelength range of from 500 to 600 nm. The second threads 6 colored red are preferably translucent. In some embodiments, the second threads 6 are substantially opaque.

Each of the first and second threads 4, 6 is UV-stabilised. For example, the threads may include a stabilizer component which absorbs ultraviolet radiation.

In the illustrated embodiment, the first and second threads 4, 6 are adapted to provide that from 12 to 18%, typically from 14 to 16%, for example about 15%, of the area of the net 2 is provided by the first and second threads 4, 6.

In the illustrated embodiment, the first and second threads 4, 6 are adapted to provide from 12 to 18%, typically from 14 to 16%, for example about 15%, shading by the net from incident sunlight on the net 2.

In the illustrated embodiment, the first and second threads 4, 6 are adapted to provide from 18 to 22%, typically 19 to 21%, scattering by the net from incident sunlight on the net 2.

In this specification, the shading % and scattering % values are calculated from measurements as described in Shahak, Y., Gussakovsky, E. E., Cohen, Y. et al. 2004. Colour Nets: A New Approach for Light Manipulation in Fruit Trees. Acta Hort. 636: 609-616. In particular, net samples having an area of 3 m×3 m were mounted 0.5 m above a flat roof that allowed unobstructed solar radiation on the nets. Upward and downward radiative flux density above and below the net was measured with solarimeters (Kipp and Zonen, type CM10, CM11 and CMP6, Delft, Holland) and photosynthetically active radiation (PAR) with "quantum" sensors (LICOR, type LI190SZ, Lincoln, Nebr.) every second and averaged every 5 minutes for a minimum of 5 days for each net. The net shading and scattering were calculated from measured radiation parameters using radiation balance equations. The spectra of the total solar radiation in the range of 300 to 1000 nm in $\mu$mol $m^{-2}s^{-1}nm^{-1}$ both under and outside the net were measured by a LiCor LI-1800 spectroradiometer employing a light diffuser of 40 mm diameter above a 300 $\mu$m fibre optic sensor as described by Shahak et al. (2004). Spectra of the total radiation measurements were done on clear days at noon. The shading %, scattering %, Red:Far Red (R:FR) and Blue:Red (B:R) ratio of both total and scattered light for crystal, pearl and red nets were calculated from spectrum measured in the wavelength between 300 and 850 nm. The calculation was performed according to wavelength ranges used by Shahak et al 2004; Blue: 410-470 nm; Red: 640-680 nm; Far Red: 680-750 nm.

In the illustrated embodiment, the first and second threads 4, 6 are adapted to provide a ratio between blue light in the wavelength range of from 410-470 nm and red light in the wavelength range of from 640-680 nm of from 1.45 to 1.53:1, typically from 1.47 to 1.51:1, of the light being scattered by the net 2 in a direction away from incident sunlight on the net 2.

In the illustrated embodiment, the first and second threads 4, 6 are adapted to provide a ratio between blue light in the wavelength range of from 410-470 nm and red light in the wavelength range of from 640-680 nm of from 1.19 to 1.21:1, the light being the total light in the respective wavelength range transmitted, scattered and reflected by the net 2 in a direction away from incident sunlight on to the net 2.

In the illustrated embodiment, the first and second threads 4,6 are adapted to provide (i) a ratio between red light in the wavelength range of from 640-680 nm and far red light in the wavelength range of from greater than 680 to up to 750 nm of from 0.63 to 0.65:1, the light being scattered by the net 2 in a direction away from incident sunlight on to the net 2, and (ii) a ratio between red light in the wavelength range of from 640-680 nm and far red light in the wavelength range of from greater than 680 to up to 750 nm of from 0.28 to 0.32:1, the light being the total light in the respective wavelength range transmitted, scattered and reflected by the net 2 in a direction away from incident sunlight on to the net 2.

In accordance with another aspect of the invention, the net 2 is used in a method of producing citrus fruit, in particular for production of citrus fruit from orange, lemon, lime, grapefruit or pomelo trees.

In the method, the photo-selective light spectrum-modifying net 2 of the invention is provided. The net 2 is supported above at least one citrus tree. Typically, the net 2 covers an orchard of a plurality of citrus trees, and the net 2 may cover many thousands of square meters. The net 2 is supported, for example by a framework, at a distance of at least 1 meter, typically from 1 to 1.75 meters, for example from 1 to 1.5 meters, above a top canopy of the at least one citrus tree. This height permits efficient light scattering by translucent and transparent filaments. The net 2 provides an air cushion above trees which allows air flow and gas exchange, and keeps heat away from the fruit and foliage. The air cushion also allows free movement of pollinating insects.

The provision of the first and second threads 4, 6 provides that the net 2 functions as a photo-selective light spectrum-modifying net 2 which modifies the incident sunlight on the upper surface of the net 2 so that the resultant electromagnetic radiation which is transmitted though the net 2 and is incident on the citrus trees beneath the net 2 has a different electromagnetic spectrum than the incident sunlight.

A first proportion of the incident electromagnetic radiation in the sunlight is transmitted directly though the openings 8 in the net 2, a second proportion of the incident electromagnetic radiation in the sunlight is absorbed by the net 2, particularly the second threads 6, a second proportion of the incident electromagnetic radiation in the sunlight is scattered by the net 2, particularly the second threads 6, downwardly away from the incident sunlight.

The net 2 consequently provides shading beneath the net 2 from the incident sunlight on the upper surface of the net 2. In the illustrated embodiment, the first and second threads 4,6 are adapted to provide from 12 to 18%, typically from 14 to 16%, for example about 15%, shading by the net 2 from incident sunlight on the net 2.

The net 2 additionally provides scattering of the incident sunlight on the upper surface of the net 2, the scattered radiation being directed downwardly towards the citrus tree(s) beneath the net 2. In the illustrated embodiment, the first and second threads 4,6 are adapted to provide from 18 to 22%, typically 19 to 21%, scattering by the net from incident sunlight on the net 2.

The second threads 6, which are red, absorb radiation in the blue and green portion of the electromagnetic spectrum and transmit, scatter and reflect radiation in the red portion of the electromagnetic spectrum, as well as far red radiation. The second threads 6, which are red, are preferably translucent. The red and far red (i.e. R+FR) portions of the electromagnetic spectrum of sunlight are not absorbed by the second threads 6. These red and far red portions are mostly transmitted through the second threads 6, coming out of the second threads 6 as scattered/diffused red or far red light. A fraction of the red and far red portions is reflected by the second threads 6. In the illustrated embodiment, the first and second threads 4, 6 are adapted to provide a ratio between blue light in the wavelength range of from 410-470 nm and red light in the wavelength range of from 640-680 nm of from 1.45 to 1.53:1, typically from 1.47 to 1.51:1, of the light being scattered by the net 2 in a direction away from incident sunlight on the net 2.

In the illustrated embodiment, the first and second threads 4, 6 are adapted to provide a ratio between blue light in the wavelength range of from 410-470 nm and red light in the wavelength range of from 640-680 nm of from 1.19 to 1.21:1, the light being the total light in the respective wavelength range transmitted, scattered and reflected by the net 2 in a direction away from incident sunlight on to the net 2.

In the illustrated embodiment, the first and second threads 4,6 are adapted to provide (i) a ratio between red light in the wavelength range of from 640-680 nm and far red light in the wavelength range of from greater than 680 to up to 750 nm of from 0.63 to 0.65:1, the light being scattered by the net 2 in a direction away from incident sunlight on to the net 2, and (ii) a ratio between red light in the wavelength range of from 640-680 nm and far red light in the wavelength range of from greater than 680 to up to 750 nm of from 0.28 to 0.32:1, the light being the total light in the respective wavelength range transmitted, scattered and reflected by the net 2 in a direction away from incident sunlight on to the net 2.

Accordingly, the net 2 provides that beneath the net, in a direction away from incident sunlight on to the net, the transmittance through the net of electromagnetic radiation, the transmittance being expressed as a percentage of the total radiation from incident sunlight on to the net in the respective wavelength range, is within the range of from 85 to 88% in the wavelength range of from 625 to 750 nm and is within the range of from 80 to 84% in the wavelength range of from 400 to 575 nm. As used herein, the term "total radiation" is defined as the sum of (i) the direct radiation from incident sunlight and (ii) the indirect radiation from incident sunlight, the indirect radiation comprising scattered, diffused, and reflected radiation, at any particular measuring location.

Beneath the net 2, in a direction away from incident sunlight on to the net 2, the scattering through the net 2 of electromagnetic radiation, the scattering being expressed as a percentage of the scattered light out of total radiation beneath the net 2 in the respective wavelength range, is at least 2% higher in the wavelength range of from 625 to 750 nm than in the wavelength range of from 400 to 575 nm. In addition, beneath the net, the scattering, i.e. the % of electromagnetic radiation scattered by the net, is within the range of from 18 to 20% in the wavelength range of from 625 to 650 nm and is within the range of from 15 to 17% in the wavelength range of from 550 to 575 nm.

In the preferred embodiments, the net for use in the present invention has a ratio, in light beneath the net as a result of sunlight incident on a top surface of the net, of scattered light to total light which is at least 24% across a wavelength range of from 600 to 700 nm.

In the preferred embodiments, the net for use in the present invention has a penetration of scattered sunlight, in light beneath the net as a result of sunlight incident on the top surface of the net, of at least 1.5 $\mu mol\ m^{-2}\ s^{-1} nm^{-1}$ across a wavelength range of from 600 to 700 nm.

In the preferred embodiments, the net for use in the present invention has a light transmittance, beneath the net as a result of sunlight incident on the top surface of the net, of at 88% of the incident sunlight across a wavelength range of from 650 to 700 nm.

These three parametric ranges, alone or in any combination of two or more thereof, provide enhanced photoselective shading by the preferred net for use in the present invention, leading to enhanced citrus fruit yield.

These three parametric ranges were measured by measuring spectra of photon flux at midday (within 30 minutes of midday) using a spectroradiometer in a "Sun-oriented" position of, in which position in the spectroradiometer the sensor surface plane is oriented perpendicular to the sun rays. The plane of the tested nets was also oriented perpendicular to sun rays, and placed at >1 m above the sensor. The spectroradiometer used was a commercial spectroradiometer available from Apogee Instruments, Inc, UT USA, measuring in the wavelength bands UV-PAR-NIR (300-1100 nm) and the sensor was sun orientated with a diffuser having a diameter (D) of 40 mm. The wavebands were defined as: UV (305-380 nm), Blue (410-470 nm), Red (640-680 nm) and Far Red (690-750 nm). Again, the values are calculated from measurements as described in Shahak, Y., Gussakovsky, E. E., Cohen, Y. et al. 2004. Colour Nets: A New Approach for Light Manipulation in Fruit Trees. Acta Hort. 636: 609-616.

The present invention will now be described further with reference to the following non-limiting Examples.

Example 1

The net of FIG. 1 was employed to shade a grove of citrus trees. The net was supported at a height of 6 m above the ground. The first and second threads comprised UV-stabilized high density polyethylene. The first threads comprises a single transparent filament of width 0.28 mm with a spacing between adjacent first threads of 2.1 mm. The second threads comprise two red filaments which are helically wound together and each filament in the second thread has a width of 0.28 mm and a spacing between adjacent second threads of 5.3 mm.

The shading by the net was determined as 15.34%.

The net of Example 1 was tested to measure the variation of transmittance, as a % of total radiation, with wavelength over the range of 300 to 850 nm. In addition, the net of Example 1 was tested to measure the variation of scattering, as a % of total radiation, with wavelength over the range of 300 to 850 nm.

At a wavelength of approximately 590 nm, there is a significant increase in transmittance, and a significant increase in scattering.

In particular, it was found that beneath the net, in a direction away from incident sunlight on to the net, the transmittance through the net of electromagnetic radiation, the transmittance being expressed as a percentage of the total radiation from incident sunlight on to the net in the respective wavelength range, was at least 3% higher in the wavelength range of from 625 to 750 nm than in the wavelength range of from 400 to 580 nm. It was found that the transmittance was within the range of from 85 to 88% in the wavelength range of from 625 to 750 nm and within the range of from 80 to 84% in the wavelength range of from 400 to 575 nm.

It was also found that the scattering through the net of electromagnetic radiation, the transmittance being expressed as a percentage of the total radiation from incident sunlight on to the net in the respective wavelength range, at least 2% higher in the wavelength range of from 625 to 750 nm than in the wavelength range of from 400 to 575 nm. The scattering was within the range of from 18 to 20% in the wavelength range of from 625 to 650 nm and within the range of from 15 to 17% in the wavelength range of from 550 to 575 nm.

This increase in transmittance and scattering provides an increase in PAR.

The net of Example 1 was tested to determine the % shading and the % scattering using the test methodology described above. The ratio between radiation in the red (R=640-680 nm) and far red (FR=690-750 nm) regions of the electromagnetic spectrum was determined for the total light and scattered light and the results are shown in Table 1. The ratio between radiation in the blue (B=410-470 nm) and red (R=640-680 nm) regions of the electromagnetic spectrum was determined for the total light and scattered light and the results are also shown in Table 1.

TABLE 1

|  | % Shading | % Scattering | R:FR Total light | R:FR Scattered light | B:R Total light | B:R Scattered light |
|---|---|---|---|---|---|---|
| Ex. 1 | 15.34 | 19.36 | 0.63 | 0.64 | 1.20 | 1.49 |

TABLE 1-continued

|  | % Shading | % Scattering | R:FR Total light | R:FR Scattered light | B:R Total light | B:R Scattered light |
|---|---|---|---|---|---|---|
| Comp. Ex 1 | 12.32 | 22.93 | 0.64 | 0.65 | 1.22 | 1.54 |
| Comp. Ex. 2 | 18.59 | 16.47 | 0.63 | 0.65 | 1.23 | 1.82 |
| Comp. Ex. 3 | 0 | 9.81 | 0.64 | 0.72 | 1.28 | 2.79 |

Comparative Examples 1 and 2

Nets having the same net construction but different filament color were tested as above and the results are shown in Table 1. Comparative Example 1 employed a net sold by Ginegar as a "Crystal" net, having uniform colorless transparent threads as the first and second threads, the shading by the net being determined as 12.32%. Comparative Example 2 employed a net sold by Ginegar as a "Pearl" net, having uniform colorless translucent threads as the first and second threads, the shading by the net being determined as 18.59%.

For Comparative Example 1, it was found that at wavelengths higher than approximately 590 nm, the % transmittance is similar to Example 1, but at lower wavelengths, the % transmittance is higher than for Example 1, which means that the net of Comparative Example 1 would tend to transmit excessive thermal radiation which is not PAR but may overheat or scorch the plants. For scattering, in Comparative Example 1 it was found that at all wavelengths the % scattering is higher than for Example 1, which again means that the net of Comparative Example 1 would tend to transmit excessive thermal radiation which is not PAR but may overheat or scorch the plants. In short, the net of Example 1 is more photo-selective for PAR than the net of Comparative Example 1.

It was found that for Comparative Example 2 at all wavelengths the % transmittance and the % scattering are lower than for Example 1, which means that the net of Comparative Example 2 would tend to transmit and scatter reduced PAR as compared to the net of Example 1. In short, the net of Example 1 is more photo-selective for PAR than the net of Comparative Example 2.

For the nets of Comparative Examples 1 and 2, each net was tested to determine the % shading and the % scattering and the results are also shown in Table 1. The ratio between radiation in the red (640-680 nm) and far red (680-750 nm) regions of the electromagnetic spectrum was determined for the total light and scattered light and the results are shown in Table 1. The ratio between radiation in the blue (410-470 nm) and red (640-680 nm) regions of the electromagnetic spectrum was determined for the total light and scattered light and the results are also shown in Table 1.

Comparative Example 3

In Comparative Example 3 no net was employed for the transmittance and scattering measurements. There was no shading without any net.

It was found that for Comparative Example 3 at all wavelengths the % scattering is lower than for Example 1. This shows that the net of Example 1 would tend to transmit and scatter high PAR as compared to having no net. In short, the net of Example 1 is more photo-selective for PAR than having no net as in Comparative Example 3.

For Comparative Example 3, the % shading and the % scattering were determined as for Example 1 and the results are also shown in Table 1. The ratio between radiation in the red (640-680 nm) and far red (680-750 nm) regions of the electromagnetic spectrum was determined for the total light and scattered light and the results are shown in Table 1. The ratio between radiation in the blue (410-470 nm) and red (640-680 nm) regions of the electromagnetic spectrum was determined for the total light and scattered light and the results are also shown in Table 1.

Referring to Table 1, it may be seen that the photo-selective net of Example 1 provides a low R:FR ratio for both total and scattered light and a low B:R ratio for both total and scattered light as Compared to Comparative Examples 1 to 3. This indicates a high degree of photo-selectivity in the PAR region of the electromagnetic spectrum. Coupled with a medium degree of shading and scattering, this would tend to reduce the likelihood of overheating of the citrus crop while permitting a high degree of PAR radiation to be transmitted and scattered onto the crop, thereby enhancing citrus fruit yield.

Example 2

In Example 2 the net of Example 1 was used as a shading and photo-selective net in an orange grove, using cultivar Valencia, over two growing seasons in an orange grove in Israel. There were 8 orange trees in season 1 and 14 orange trees in season 2 covered by the net of Example 1.

Figure 2:
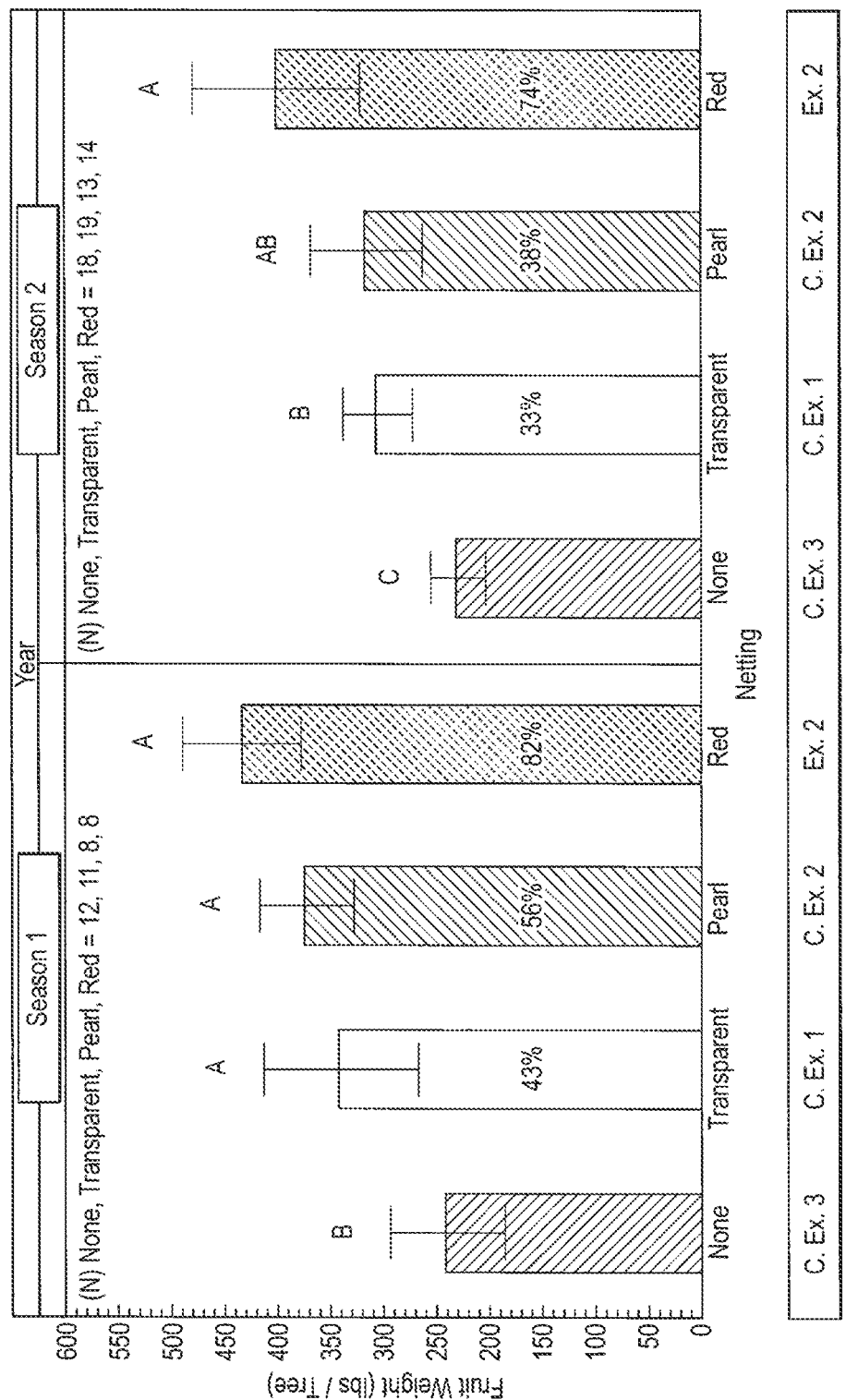
FIG. 2 shows the relationship between fruit weight per tree in each of two growing seasons in which a net was used as a spectral manipulation net for citrus trees in incident sunlight in Israel, in an Example according to the present invention and Comparative Examples.

The orange trees were mature trees used in commercial production of oranges, and the trees were fully irrigated. There were 165 trees per acre in the tested tree grove. The net was supported at a distance of from 1 to 1.5 meters above the top of the tree canopy at the start of the test period. The fruit weight per tree was determined in each of the two growing seasons, and the results are shown in FIG. 2.

The increase in yield as compared to using no net (equivalent to Comparative Example 3 above) is indicated by a % value for the respective season. There were 12 orange trees in season 1 and 18 orange trees in season 2 not covered by any net in Comparative Example 3. In can be seen that the net of Example 1 significantly increased orange fruit yield over the two growing seasons, achieving a greater than 50% increase in yield, as compared to using no net.

The error bar indicates a 95% confidence interval of each mean value.

The nets of Comparative Examples 1 and 2 were also used as a shading and photo-selective net in an orange grove over the two growing seasons. Again, the results are shown in FIG. 2. There were 11 orange trees in season 1 and 19 orange trees in season 2 covered by the net of Comparative Example 1. There were 8 orange trees in season 1 and 13 orange trees in season 2 covered by the net of Comparative Example 2.

A comparison of the data from FIG. 2 shows that the net of Example 1 provided a higher orange fruit yield than the nets of Comparative Examples 1 and 2 and the absence of any net in Comparative Example 3.

Example 3

The net of Example 1 was used as a shading and photo-selective net in an orange grove over a part of a growing season. There were 11 orange trees of cultivar Valencia covered by the net of Example 1.

The orange trees were mature trees used in commercial production of oranges, and the trees were fully irrigated. The net was supported at a distance of from 1 to 1.5 meters above the top of the tree canopy at the start of the test period. The fruit diameter of the fruit was determined and a fruit size (i.e. diameter) distribution was calculated, and the results are shown in FIG. 3.

It may be seen that using the net of Example 1 provided a narrow fruit diameter distribution, with the greatest number of fruit per tree being in the range of 60 to 65 mm. The narrowing of the fruit size distribution increases juice extraction from the citrus fruit, for example oranges produced for fruit juice processing as used in this example. It is believed that this technical effect can also apply to other citrus fruit.

Figure 3:
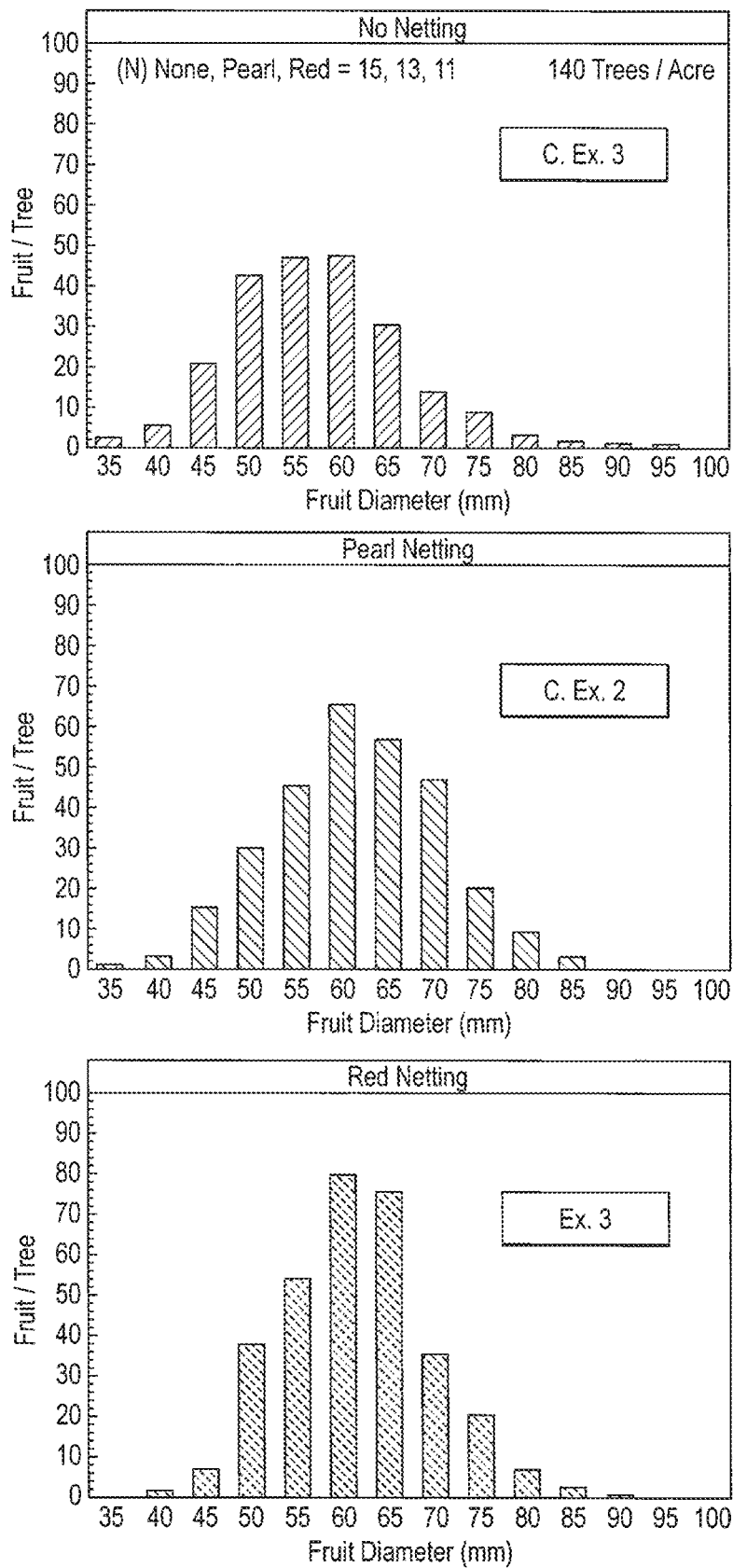
FIG. 3 shows the relationship between number of fruit per tree and fruit diameter in part of a growing season in which a net was used as a spectral manipulation net for citrus trees in incident sunlight, in an Example according to the present invention and Comparative Examples.

The narrowing of the fruit size distribution as compared to using no net (equivalent to Comparative Example 3 above) is clearly shown in FIG. 3. There were 15 orange trees not covered by any net in this comparison. In addition, the narrowing of the fruit size distribution as compared to using a Pearl net (equivalent to Comparative Example 2 above) is clearly shown in FIG. 3. There were 13 orange trees covered by a Pearl net in this comparison.

Example 4

The net of Example 1 was used as a shading and photo-selective net in an orange grove over a part of a growing season. There were 13 orange trees of cultivar Valencia covered by the net of Example 1.

Figure 4:
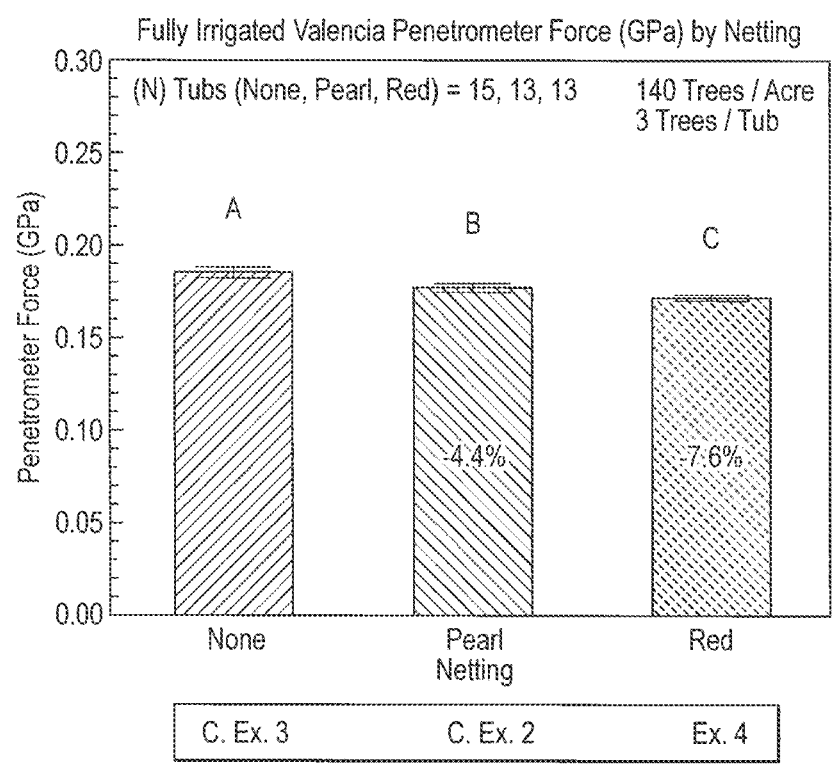
FIG. 4 shows the firmness (measured by penetrometer force) for fruit grown in part of a growing season in which a net was used as a spectral manipulation net for citrus trees in incident sunlight in Florida, USA, in an Example according to the present invention and Comparative Examples.

The orange trees were mature trees used in commercial production of oranges, and the trees were fully irrigated. The net was supported at a distance of from 1 to 1.5 meters above the top of the tree canopy at the start of the test period. The firmness of the fruit was determined using a penetrometer to measure a penetrometer force, and the results are shown in FIG. 4.

It may be seen that using the net of Example 1 provided a lower penetrometer force, which corresponds to firmer fruit, as compared to no net (equivalent to Comparative Example 3 above). There were 15 orange trees not covered by any net in this comparison. In addition, using the net of Example 1 provided a lower penetrometer force, which corresponds to firmer fruit, as compared to using a Pearl net (equivalent to Comparative Example 2 above). There were 13 orange trees covered by a Pearl net in this comparison.

The achievement of statistically firmer citrus fruit using a net in accordance with the present invention increases the juice extraction from the citrus fruit, in particular oranges produced for fruit juice processing. It is believed that this technical effect can also apply to other citrus fruit.

Example 5

The net of Example 1 was used as a shading and photo-selective net over orange grown in two orange groves, with varieties Valencia and Hamlin, over a part of a growing season. There were 117 orange trees of cultivar Valencia covered by the net of Example 1.

Figure 5:
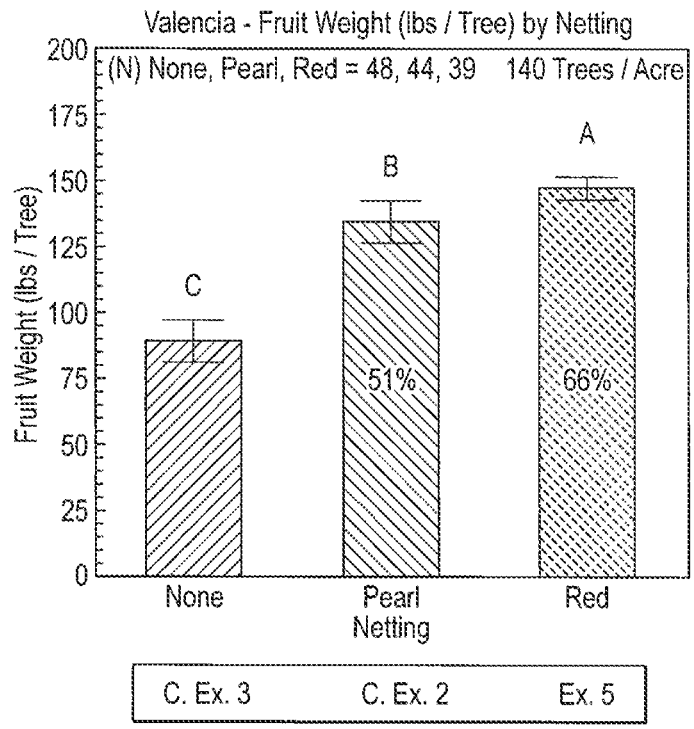
FIG. 5 shows the relationship between fruit weight per tree in part of a growing season in which a net was used as a spectral manipulation net for citrus trees of two cultivars in incident sunlight, in an Example according to the present invention and Comparative Examples.
Figure 5:
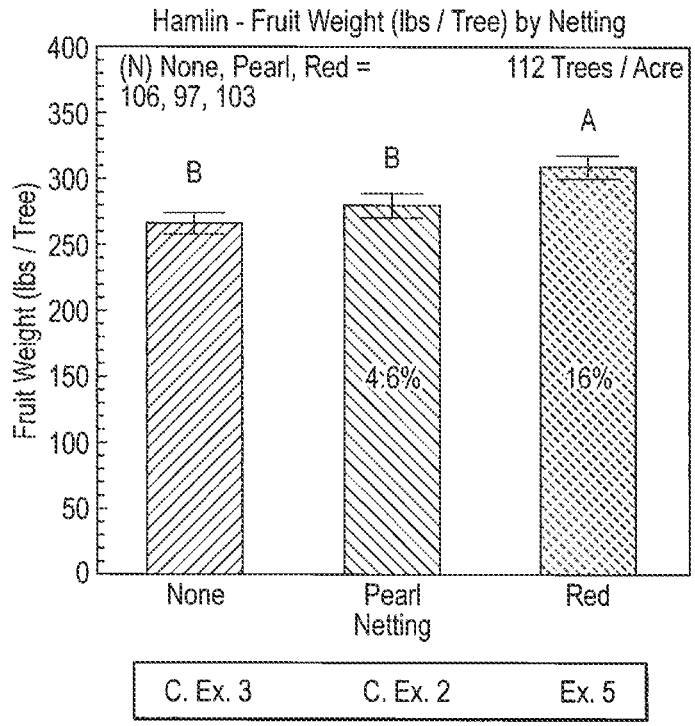

The orange trees were mature trees used in commercial production of oranges, and the trees were fully irrigated. The net was supported at a distance of from 1 to 1.5 meters above the top of the tree canopy at the start of the test period. The number of fruit per tree was determined, and the results are shown in FIG. 5.

It may be seen that using the net of Example 1 provided a higher fruit yield, 65.8% and 24.8% (varieties Valencia and Hamlin respectively) higher as compared to using no net (equivalent to Comparative Example 3 above). There were 144 orange trees not covered by any net in this comparison. In addition, using the net of Example 1 provided a higher fruit yield, as compared to using a Pearl net (equivalent to Comparative Example 2 above). The Pearl net provided a 48.3% and 1.8% (varieties Valencia and Hamlin respectively) higher yield than using no net. There were 126 orange trees covered by a Pearl net in this comparison.

The achievement of statistically higher citrus fruit yield per tree using a net in accordance with the present invention increases the total volume of fruit juice extracted from a given number of the citrus fruit trees, in particular oranges produced for fruit juice processing. It is believed that this technical effect can also apply to other citrus fruit.

Example 6

The net of Example 1 was subjected to a variety of spectral measurements to determine the ability of the net to transmit and scatter electromagnetic radiation from incident sunlight onto citrus trees below the net, with the transmitted and scattered electromagnetic radiation being in desired wavelength bands to enhance photosynthesis, thereby increasing fruit yield, and to reduce heat load. These parameters were measured using the protocol described above, in particular by measuring spectra of photon flux at midday (within 30 minutes of midday) using a spectroradiometer in a "Sun-oriented" position of, in which position in the spectroradiometer the sensor surface plane is oriented perpendicular to the sun rays. The plane of the tested nets was also oriented perpendicular to sun rays, and placed at >1 m above the sensor. The spectroradiometer used was a commercial spectroradiometer available from Apogee Instruments, Inc, UT USA, measuring in the wavelength bands UV-PAR-NIR (300-1100 nm) and the sensor was sun orientated with a diffuser having a diameter (D) of 40 mm. The wavebands were defined as: UV (305-380 nm), Blue (410-470 nm), Red (640-680 nm) and Far Red (690-750 nm). Again, the values are calculated from measurements as described in Shahak, Y., Gussakovsky, E. E., Cohen, Y. et al. 2004. Colour Nets: A New Approach for Light Manipulation in Fruit Trees. Acta Hort. 636: 609-616.

Figure 6:
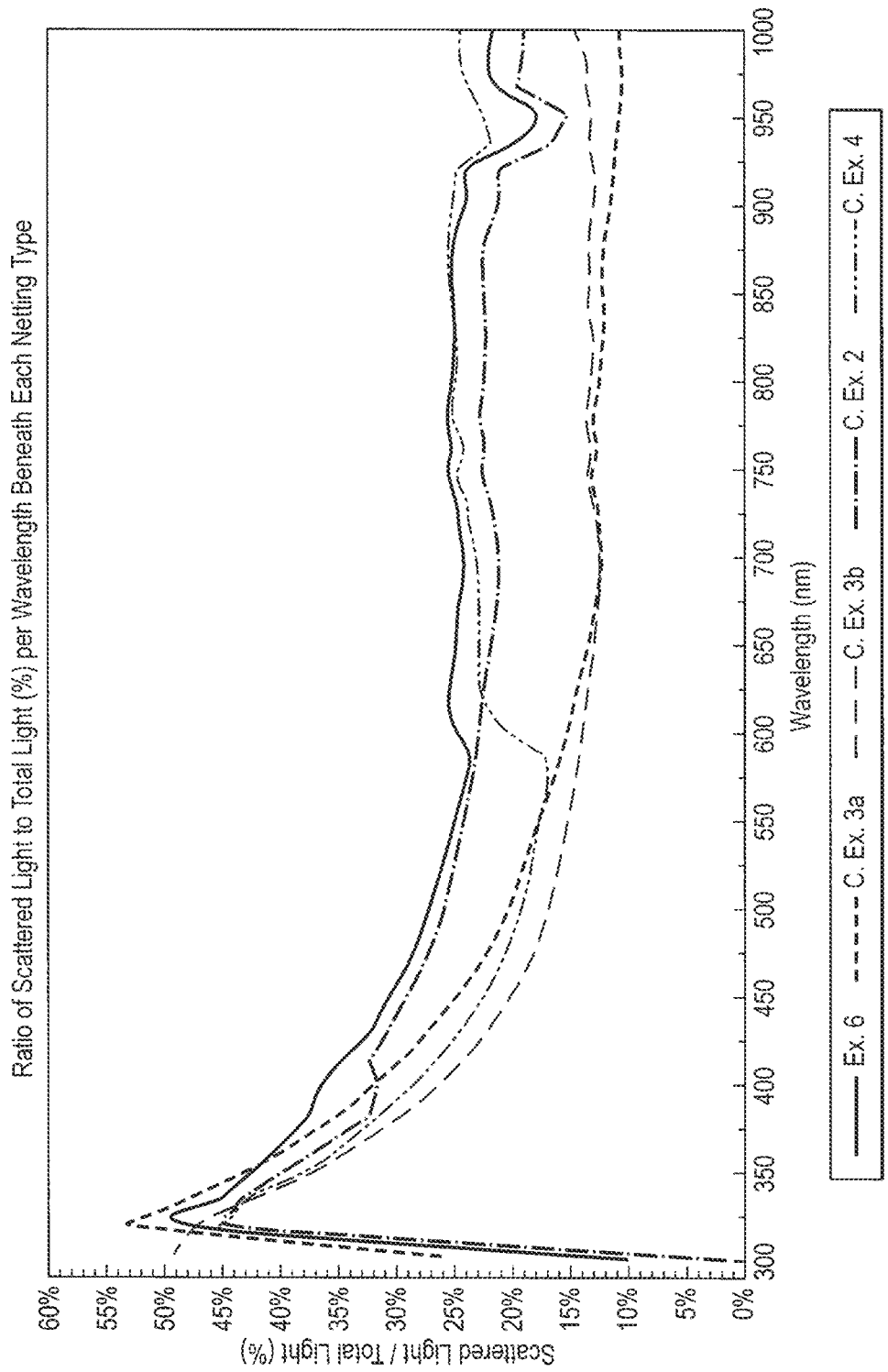
FIG. 6 shows the relationship between the ratio of scattered light to total light and wavelength for a spectral manipulation net for citrus trees in incident sunlight, in an Example according to the present invention and Comparative Examples.

Referring to FIG. 6, this graph shows, for net of Example 1, the variation with wavelength of the ratio, within light beneath the net as a result of sunlight incident on the top surface of the net, of the scattered light to total light. The plot for Example 6 exhibits a high scattering ratio, particularly in the wavelength regions of 400 to 500 nm and 600 to 700 nm in which photosynthesis is enhanced.

Figure 7:
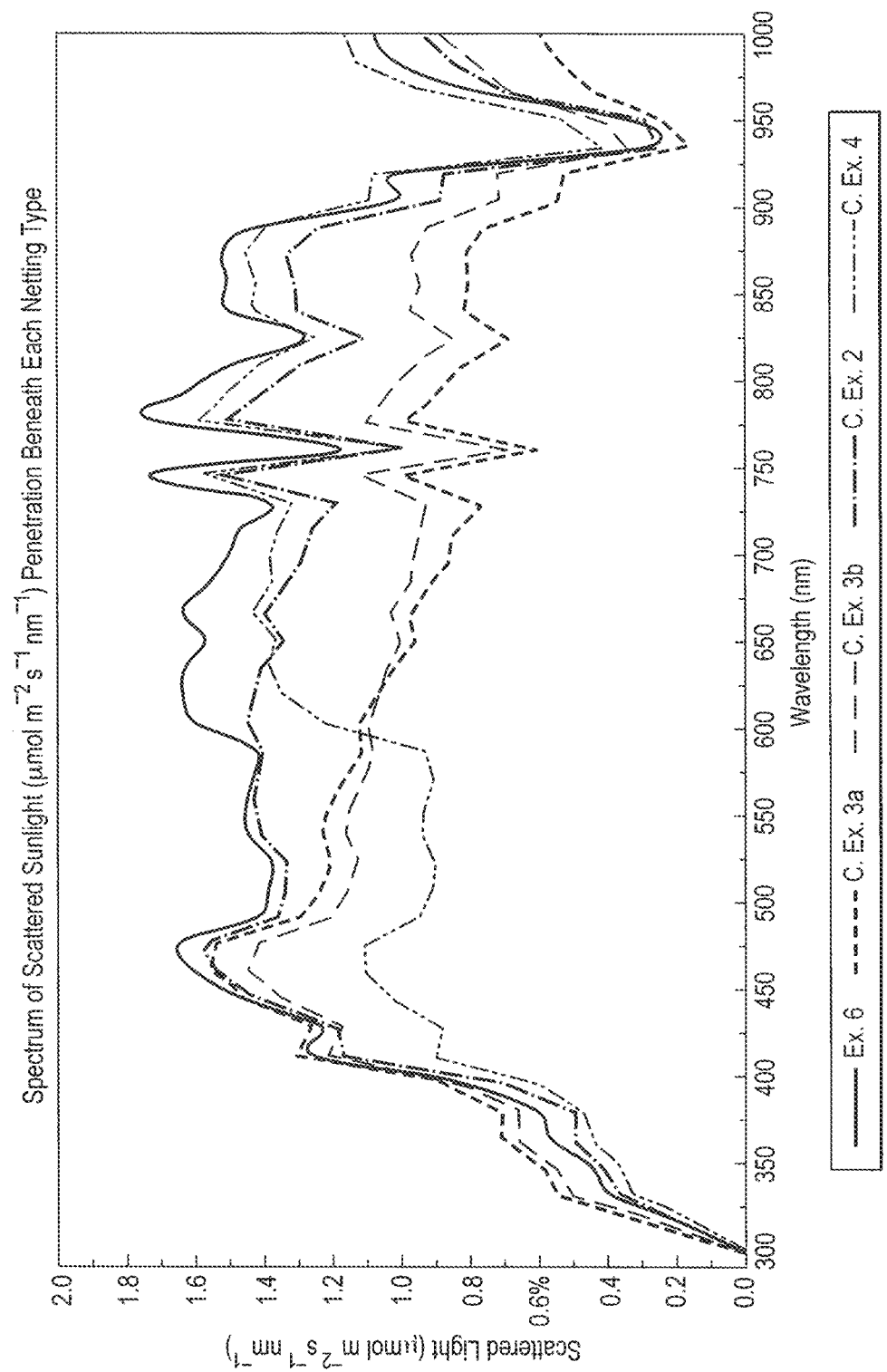
FIG. 7 shows the relationship between of scattered light penetration and wavelength for a spectral manipulation net for citrus trees in incident sunlight, in an Example according to the present invention and Comparative Examples.

Referring to FIG. 7, this graph shows, for net of Example 1, the variation with wavelength of the scattered sunlight penetration, within light beneath the net as a result of sunlight incident on the top surface of the net. The plot for Example 6 exhibits a high amount of scattered light, particularly in the wavelength regions of 450 to 500 nm and 600 to 700 nm in which photosynthesis is enhanced.

Figure 8:
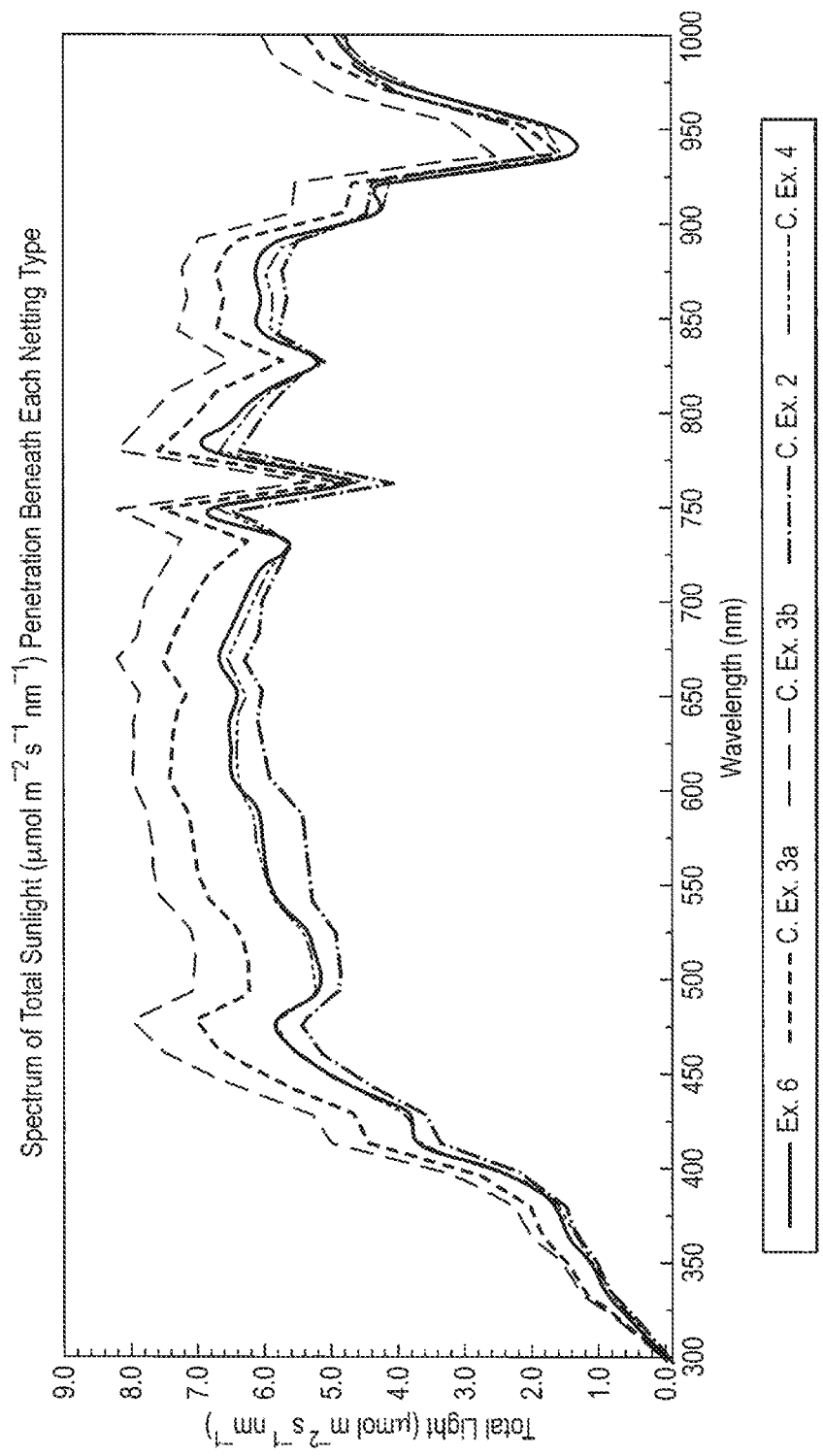
FIG. 8 shows the relationship between total light penetration and wavelength for a spectral manipulation net for citrus trees in incident sunlight, in an Example according to the present invention and Comparative Examples.

Referring to FIG. 8, this graph shows, for net of Example 1, the variation with wavelength of the total sunlight penetration beneath the net as a result of sunlight incident on the top surface of the net. The plot for Example 6 exhibits a relatively low amount of total sunlight, but with peaks in the wavelength regions of 450 to 500 nm and 600 to 700 nm in which photosynthesis is enhanced.

FIG. 6 shows that the net has a ratio, in light beneath the net as a result of sunlight incident on a top surface of the net, of scattered light to total light which is at least 24% across a wavelength range of from 600 to 700 nm. FIG. 7 shows that the net has a penetration of scattered sunlight, in light beneath the net as a result of sunlight incident on the top surface of the net, of at least 1.5 µmol m$^{-2}$ s$^{-1}$nm$^{-1}$ across a wavelength range of from 600 to 700 nm. FIG. 8 shows that the net has a light transmittance, beneath the net as a result of sunlight incident on the top surface of the net, of at least 88% of the incident sunlight across a wavelength range of from 650 to 700 nm.

As a comparison, FIGS. 6 to 8 also show corresponding plots when there is no net, as in Comparative Example 3. In fact, there are two Comparative Examples 3a and 3b in which no net was present. FIG. 6 shows that when there is no net present, there is a significantly lower ratio of scattered light, particularly in the wavelength regions of 450 to 500 nm and 600 to 700 nm in which photosynthesis is enhanced. Also, FIG. 7 shows that when there is no net present, there is a significantly lower amount of scattered light, particularly in the wavelength regions of 450 to 500 nm and 600 to 700 nm in which photosynthesis is enhanced. Finally, FIG. 8 shows that the total sunlight beneath the net is significantly higher across all wavelengths when no net is employed as compared to when the net of Example 1 is employed. This data shows that the use of the net according to the present invention significantly enhances photosynthesis, and reduces heat load, on citrus trees even though the net reduces the total electromagnetic radiation from sunlight reaching the fruit trees. The spectral data of FIGS. 6 to 8 cumulatively show that the net of Example 1 is highly photo-selective in wavelength regions to achieve enhanced citrus fruit yield, enhanced fruit size uniformity and increased fruit firmness, all of which can lead to enhanced fruit juice production from citrus trees, in particular oranges produced for fruit juice processing. It is believed that this technical effect can also apply to other citrus fruit.

FIGS. 6 to 8 also compare the net of Example 1 against the net of Comparative Example 2 and a further net of Comparative Example 4. In Comparative Example 4, the net has a thread arrangement similar to that of Example 1 except that all of the first and second threads are colored red and composed of polymer which incorporates a red pigment or dye threads, and no threads are white, transparent or translucent. The net of Comparative Example 4 provides 20% shading by the net from incident sunlight on the net.

Referring to FIG. 6, this graph shows, for the net of Example 1, that the plot for Example 6 exhibits a higher scattering ratio than both the Pearl net of Comparative Example 2 and the entirely Red net of Comparative Example 4, particularly in the wavelength regions of 400 to 500 nm and 600 to 700 nm in which photosynthesis is enhanced. Referring to FIG. 7, this graph shows, for net of Example 1, that the plot for Example 6 exhibits a high amount of scattered light, particularly in the wavelength regions of 450 to 500 nm and 600 to 700 nm in which photosynthesis is enhanced, than both the Pearl net of Comparative Example 2 and the entirely Red net of Comparative Example 4. Referring to FIG. 8, this graph shows, for net of Example 1, that the plot for Example 6 exhibits a somewhat similar of slightly higher amount of total sunlight as compared to both the Pearl net of Comparative Example 2 and the entirely Red net of Comparative Example 4.

Figure 9:
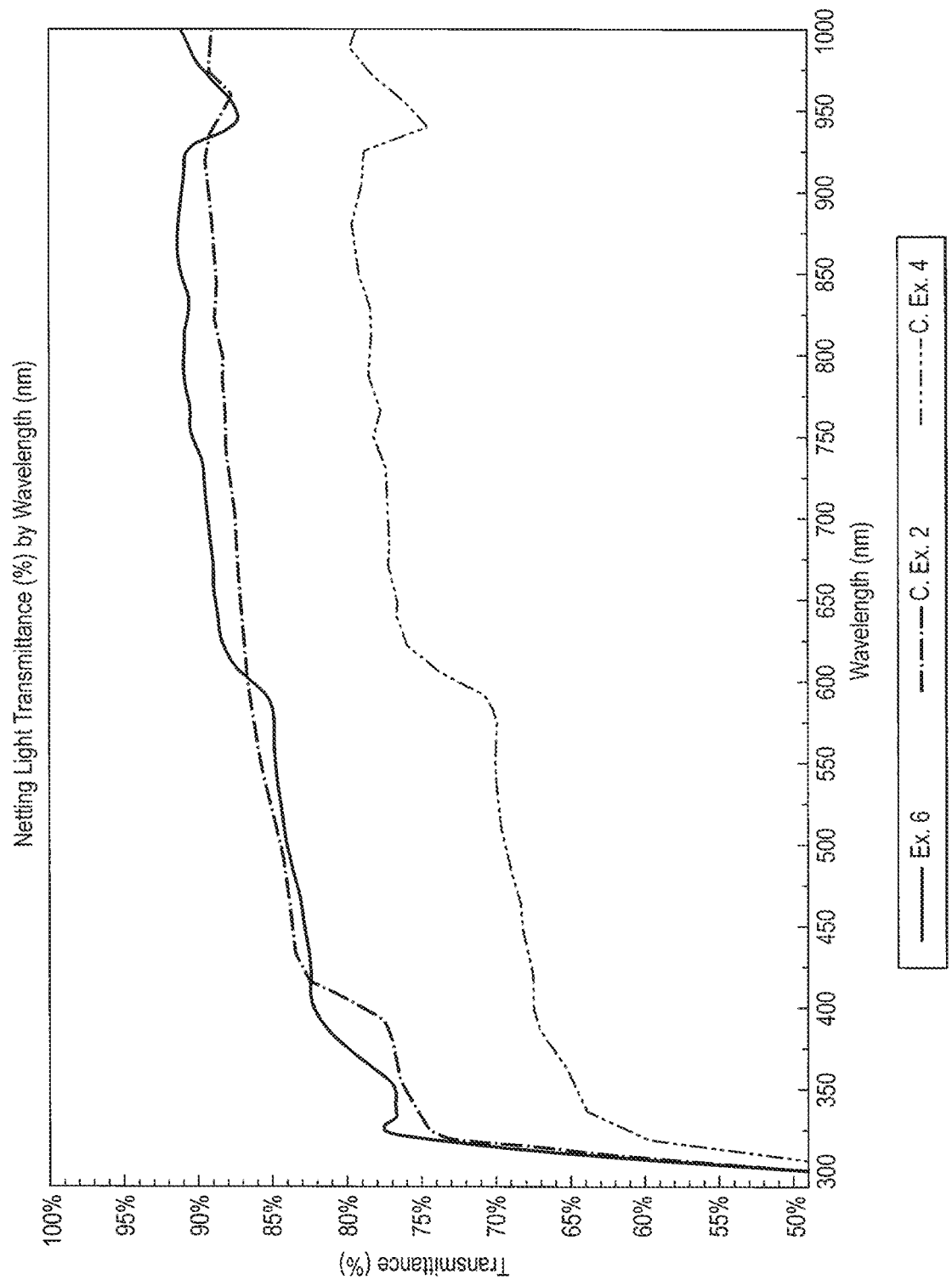
FIG. 9 shows the relationship between light transmittance and wavelength for a spectral manipulation net for citrus trees in incident sunlight, in an Example according to the present invention and Comparative Examples.
Figure 10:
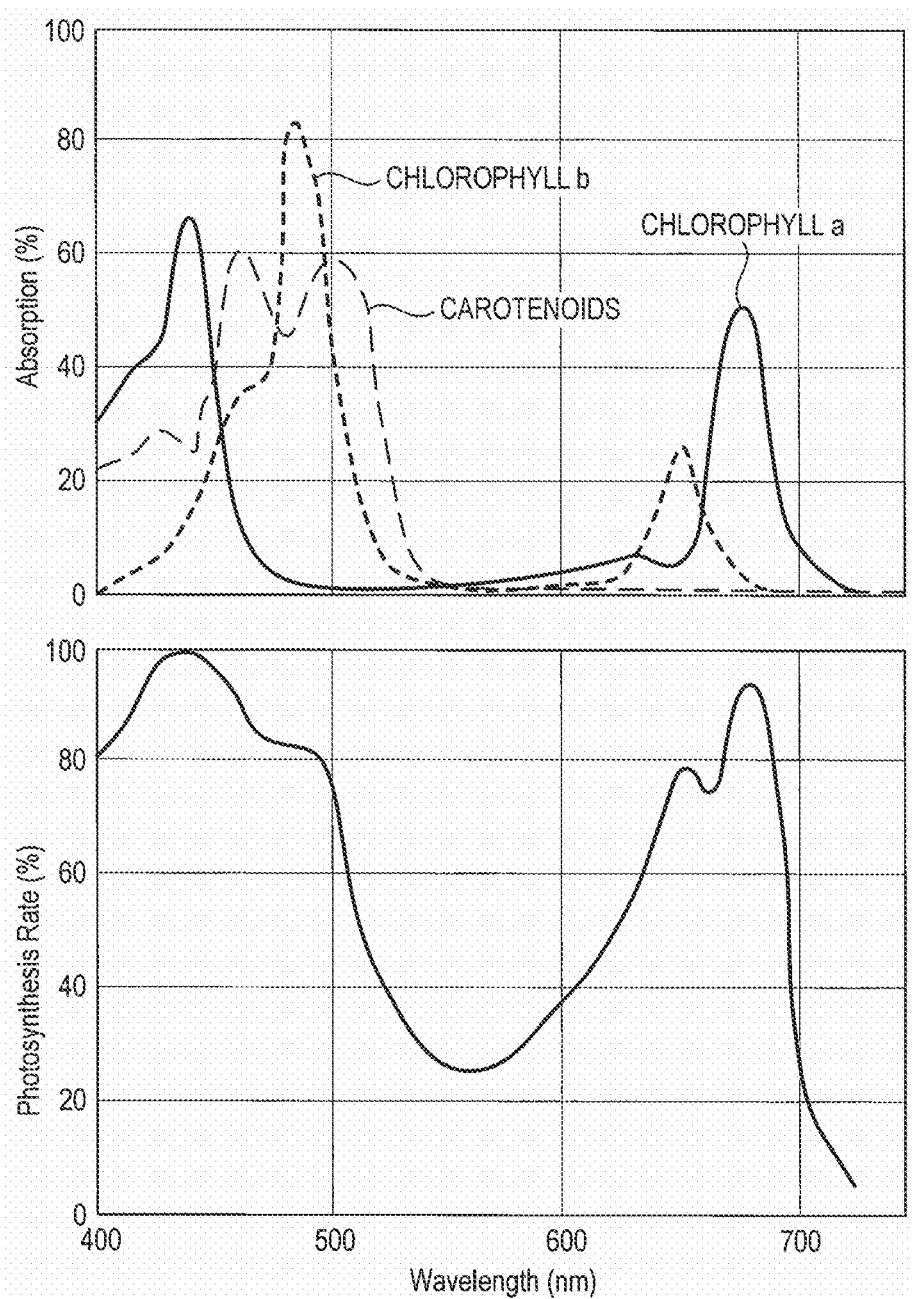
FIG. 10 is a graph showing the relationship between radiation wavelength and light absorption for the different chlorophyll types for a citrus tree in incident sunlight and associated photosynthetic rate.

Referring to FIG. 9, this graph shows, for net of Example 1, the Pearl net of Comparative Example 2 and the entirely Red net of Comparative Example 4, the variation with wavelength of the transmitted light, within light beneath the net as a result of sunlight incident on the top surface of the net. The plot for Example 6 exhibits a high amount of transmitted light, particularly in the wavelength region of 600 to 700 nm in which photosynthesis is enhanced. In this wavelength region to transmitted light for the net of Example 1 is significantly higher than for the entirely Red net of Comparative Example 4, and somewhat higher than for the Pearl net of Comparative Example 2.

The results of FIGS. 6 to 9 cumulatively show that the net of the present invention has a higher photo-selective effect in wavelength regions which enhance photosynthesis and which increase fruit yield in citrus trees, particularly as a result of light scattering, than the Pearl net of Comparative Example 2 and the entirely Red net of Comparative Example 4.

Various other modifications to the present invention will be readily apparent to those skilled in the art.

The invention claimed is:

1. A photo-selective light spectrum-modifying net for use in citrus fruit production, the net comprising a woven array of parallel and mutually spaced first threads and an array of parallel and mutually spaced second threads, the second threads being inclined to the first threads to define an array of openings between the first and second threads, wherein the first threads are transparent or translucent and composed of a first polymer which is selected from a polymer incorporating a white pigment or dye, a transparent polymer, or a translucent polymer, and the second threads are translucent, colored red, and composed of a second polymer which incorporates a red pigment or dye, the second threads being adapted to transmit, scatter and reflect electromagnetic radiation in the wavelength range of from 640 to 680 nm.

2. The net according to claim 1 wherein the second threads are adapted to absorb electromagnetic radiation in the wavelength range of from 500 to 600 nm.

3. The net according to claim 1 wherein the net defines an area of which the first and second threads are adapted to provide from 12 to 18% of the area.

4. The net according to claim 1 wherein the net defines an area of which the first and second threads are adapted to provide that from 14 to 16% of the area.

5. The net according to claim 1 wherein the first and second threads are adapted to provide from 12 to 18% shading by the net from incident sunlight on the net.

6. The net according to claim 5 wherein the first and second threads are adapted to provide from 14 to 16% shading by the net from incident sunlight on the net.

7. The net according to claim 1 wherein the first and second threads are adapted to provide from 18 to 22% scattering of light by the net from incident sunlight on the net.

8. The net according to claim 7 wherein the first and second threads are adapted to provide from 19 to 21% scattering of light by the net from incident sunlight on the net.

9. The net according to claim 1 wherein the first and second threads are adapted to provide a ratio between blue light in the wavelength range of from 410-470 nm and red light in the wavelength range of from 640-680 nm of from 1.45 to 1.53:1, the light being scattered by the net in a direction away from incident sunlight on the net.

10. The net according to claim 9 wherein the first and second threads are adapted to provide a ratio between blue light in the wavelength range of from 410-470 nm and red light in the wavelength range of from 640-680 nm of from 1.47 to 1.51:1, the light being scattered by the net in a direction away from incident sunlight on the net.

11. The net according to claim 1 wherein the first and second threads are adapted to provide a ratio between blue light in the wavelength range of from 410-470 nm and red light in the wavelength range of from 640-680 nm of from 1.19 to 1.21:1, the light being the total light in the respective wavelength range transmitted, scattered and reflected by the net in a direction away from incident sunlight on to the net.

12. The net according to claim 1 wherein the first and second threads are adapted to provide (i) a ratio between red light in the wavelength range of from 640-680 nm and far red light in the wavelength range of from greater than 680 to up to 750 nm of from 0.63 to 0.65:1, the light being scattered by the net in a direction away from incident sunlight on to the net, and (ii) a ratio between red light in the wavelength range of from 640-680 nm and far red light in the wavelength range of from greater than 680 to up to 750 nm of from 0.28 to 0.32:1, the light being the total light in the respective wavelength range transmitted, scattered and reflected by the net in a direction away from incident sunlight on to the net.

13. The net according to claim 1 wherein the first and second threads are mutually orthogonal and the openings are rectangular.

14. The net according to claim 13 wherein the rectangular openings have an area of from 8 to 15 $mm^2$.

15. The net according to claim 14 wherein the rectangular openings have an area of from 10 to 12 $mm^2$.

16. The net according to claim 1 wherein the second threads have a spacing between adjacent second threads of from 4 to 6 mm.

17. The net according to claim 16 wherein the second threads have a spacing between adjacent second threads of from 4.5 to 5.5 mm.

18. The net according to claim 1 wherein the first threads have a spacing between adjacent first threads of from 1.2 to 3 mm.

19. The net according to claim 18 wherein the first threads have a spacing between adjacent first threads of from 1.8 to 2.5 mm.

20. The net according to claim 1 wherein each second thread comprises a plurality of filaments which are helically wound together to form a multi-filament thread.

21. The net according to claim 20 wherein each second thread comprises two filaments which are helically wound together to form a multi-filament thread.

22. The net according to claim 20 wherein each filament in the second thread has a width of from 0.26 to 0.3 mm.

23. The net according to claim 1 wherein each first thread comprises a single filament.

24. The net according to claim 23 wherein the filament in the first thread has a width of from 0.26 to 0.3 mm.

25. The net according to claim 1 wherein each of the first and second threads comprises high density polyethylene.

26. A method of producing citrus fruit, the method comprising the steps of:
   i. providing a photo-selective light spectrum-modifying net comprising a woven array of parallel and mutually spaced first threads and an array of parallel and mutually spaced second threads, the second threads being inclined to the first threads to define an array of openings between the first and second threads, wherein the first threads are transparent or translucent and are composed of a first polymer which is selected from a polymer incorporating a white pigment or dye, a transparent polymer or a translucent polymer, and the second threads transmit, scatter and reflect electromagnetic radiation in the wavelength range of from 640 to 680 nm and are translucent, colored red, and composed of a second polymer which incorporates a red pigment or dye; and
   ii. supporting the net above at least one citrus tree.

27. The method according to claim 26 wherein the net is supported at a distance of at least 1 meter above a top canopy of the at least one citrus tree.

28. The method according to claim 27 wherein the net is supported at a distance of from 1 to 1.75 meters above a top canopy of the at least one citrus tree.

29. The method according to claim 28 wherein the net is supported at a distance of from 1 to 1.5 meters above a top canopy of the at least one citrus tree.

30. The method according to claim 26 wherein the citrus tree is an orange, lemon, lime, grapefruit or pomelo tree.

31. The method according to claim 30 wherein the citrus tree is an orange tree.

32. The method according to claim 26 wherein beneath the net, in a direction away from incident sunlight on to the net, the transmittance through the net of electromagnetic radiation, the transmittance being expressed as a percentage of the total radiation from incident sunlight on to the net in the respective wavelength range, at least 3% higher in the wavelength range of from 625 to 750 nm than in the wavelength range of from 400 to 580 nm.

33. The method according to claim 26 wherein beneath the net, in a direction away from incident sunlight on to the net, the transmittance through the net of electromagnetic radiation, the transmittance being expressed as a percentage of the total radiation from incident sunlight on to the net in the respective wavelength range, is within the range of from 85 to 88% in the wavelength range of from 625 to 750 nm and is within the range of 80 to 84% in the wavelength range of from 400 to 575 nm.

34. The method according to claim 26 wherein beneath the net, in a direction away from incident sunlight on to the net, the scattering through the net of electromagnetic radiation, the scattering being expressed as a percentage of the total radiation from incident sunlight on to the net in the respective wavelength range, at least 2% higher in the wavelength range of from 625 to 750 nm than in the wavelength range of from 400 to 575 nm.

35. The method according to claim 26 wherein beneath the net, in a direction away from incident sunlight on to the net, the scattering through the net of electromagnetic radiation, the scattering being expressed as a percentage of the total radiation from incident sunlight on to the net in the respective wavelength range, is within the range of from 18 to 20% in the wavelength range of from 625 to 650 nm and is within the range of from 15 to 17% in the wavelength range of from 550 to 575 nm.

36. The method according to claim 26 wherein the second threads absorb electromagnetic radiation in the wavelength range of from 500 to 600 nm.

37. The method according to claim 26 wherein the first and second threads provide that from 12 to 18% of the area of the net is provided by the first and second threads.

38. The method according to claim 37 wherein the first and second threads provided that from 14 to 16% of the area of the net is provided by the first and second threads.

39. The method according to claim 26 wherein the first and second threads provide from 12 to 18% shading by the net from incident sunlight on the net.

40. The method according to claim 39 wherein the first and second threads provide from 14 to 16% shading by the net from incident sunlight on the net.

41. The method according to claim 26 wherein the first and second threads provide from 18 to 22% scattering of light by the net from incident sunlight on the net.

42. The method according to claim 41 wherein the first and second threads provide from 19 to 21% scattering of light by the net from incident sunlight on the net.

43. The method according to claim 26 wherein the first and second threads provide a ratio between blue light in the wavelength range of from 410-470 nm and red light in the wavelength range of from 640-680 nm of from 1.45 to 1.53:1, the light being scattered by the net in a direction away from incident sunlight on the net.

44. The method according to claim 26 wherein the first and second threads provide a ratio between blue light in the wavelength range of from 410-470 nm and red light in the wavelength range of from 640-680 nm of from 1.47 to 1.51:1, the light being scattered by the net in a direction away from incident sunlight on the net.

45. The method according to claim 26 wherein the first and second threads provide a ratio between blue light in the wavelength range of from 410-470 nm and red light in the wavelength range of from 640-680 nm of from 1.19 to 1.21:1, the light being the total light in the respective wavelength range transmitted, scattered and reflected by the net in a direction away from incident sunlight on to the net.

46. The method according to claim 26 wherein the first and second threads provide (i) a ratio between red light in the wavelength range of from 640-680 nm and far red light in the wavelength range of from greater than 680 to up to 750 nm of from 0.63 to 0.65:1, the light being scattered by the net in a direction away from incident sunlight on to the net, and (ii) a ratio between red light in the wavelength range of from 640-680 nm and far red light in the wavelength range of from greater than 680 to up to 750 nm of from 0.28 to 0.32:1, the light being the total light in the respective wavelength range transmitted, scattered and reflected by the net in a direction away from incident sunlight on to the net.

47. A method of producing citrus fruit, the method comprising the steps of:
i. providing a photo-selective light spectrum-modifying net comprising a woven array of parallel and mutually spaced first threads and an array of parallel and mutually spaced second threads, the second threads being inclined to the first threads to define an array of openings between the first and second threads, wherein the first threads are transparent or translucent and composed of a first polymer which is selected from a polymer incorporating a white pigment or dye, a transparent polymer, or a translucent polymer, and the second threads are translucent, colored red, and are composed of a polymer which incorporates a red pigment or dye, wherein the net has a ratio, in light beneath the net as a result of sunlight incident on a top surface of the net, of scattered light to total light which is at least 24% across a wavelength range of from 600 to 700 nm; and
ii. supporting the net above at least one citrus tree at a distance of at least 1 meter above a top canopy of the at least one citrus tree.

48. The method according to claim 47 wherein the net is supported at a distance of from 1 to 1.75 meters above a top canopy of the at least one citrus tree.

49. The method according to claim 48 wherein the net is supported at a distance of from 1 to 1.5 meters above a top canopy of the at least one citrus tree.

50. The method according to claim 47 wherein the net has a penetration of scattered sunlight, in light beneath the net as a result of sunlight incident on the top surface of the net, of at least 1.5 µmol m$^{-2}$ s$^{-1}$nm$^{-1}$ across a wavelength range of from 600 to 700 nm.

51. The method according to claim 47 wherein the net has a light transmittance, beneath the net as a result of sunlight incident on the top surface of the net, of at least 88% of the incident sunlight across a wavelength range of from 650 to 700 nm.

52. The method according to claim 47 wherein the citrus tree is an orange, lemon, lime, grapefruit or pomelo tree.

53. The method according to claim 52 wherein the citrus tree is an orange tree.

54. The method according to claim 47 wherein the threads which are colored red reflect electromagnetic radiation in the wavelength range of from 640 to 680 nm.

55. The method according to claim 47 wherein the threads which are colored red absorb electromagnetic radiation in the wavelength range of from 500 to 600 nm.

56. The method according to claim 47 wherein the net provides from 12 to 18% shading by the net from incident sunlight on the net.

57. The method according to claim 56 wherein the net provides from 14 to 16% shading by the net from incident sunlight on the net.

58. The method according to claim 57 wherein the net provides from 18 to 22% scattering of light by the net from incident sunlight on the net.

59. The method according to claim 58 wherein the net provides from 19 to 21% scattering of light by the net from incident sunlight on the net.

60. A method of producing fruit juice, the method comprising producing citrus fruit according to claim 27 and processing the citrus fruit to produce fruit juice therefrom.

61. A method according to claim 60 wherein the citrus fruit comprises oranges.

* * * * *